(12) United States Patent
Fan et al.

(10) Patent No.: US 10,938,557 B2
(45) Date of Patent: Mar. 2, 2021

(54) DISTRIBUTED LEDGER FOR GENERATING AND VERIFYING RANDOM SEQUENCE

(71) Applicant: International Business Machines Corporation, Armonk, NY (US)

(72) Inventors: Si Bin Fan, Beijing (CN); David Kaminsky, Chapel Hill, NC (US); Tao Liu, Shiyan (CN); Jing Lu, Beijing (CN); Xiao Yan Tang, Beijing (CN); Jun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 15/910,975

(22) Filed: Mar. 2, 2018

(65) Prior Publication Data

US 2019/0273610 A1    Sep. 5, 2019

(51) Int. Cl.
| | |
|---|---|
| *H04L 9/08* | (2006.01) |
| *G06F 7/58* | (2006.01) |
| *H04L 9/14* | (2006.01) |
| *H04L 9/32* | (2006.01) |
| *H04L 9/34* | (2006.01) |
| *H04L 9/06* | (2006.01) |

(52) U.S. Cl.
CPC ............ *H04L 9/0869* (2013.01); *G06F 7/582* (2013.01); *H04L 9/0637* (2013.01); *H04L 9/14* (2013.01); *H04L 9/3239* (2013.01); *H04L 9/3242* (2013.01); *H04L 9/3247* (2013.01); *H04L 9/34* (2013.01); *G06F 7/58* (2013.01); *H04L 2209/38* (2013.01)

(58) Field of Classification Search
CPC ... H04L 9/0869; H04L 9/3247; H04L 9/3239; H04L 9/3242; H04L 9/14; H04L 9/34; H04L 9/0637; G06F 7/582; G06F 7/58

USPC ......................................................... 713/153
See application file for complete search history.

(56) References Cited

U.S. PATENT DOCUMENTS

| | | |
|---|---|---|
| 6,728,740 B2 | 4/2004 | Kelly et al. |
| 7,421,462 B2 * | 9/2008 | Castejon-Amenedo ..................... H03K 3/84 708/250 |
| 8,359,456 B2 | 1/2013 | Adir et al. |

(Continued)

OTHER PUBLICATIONS

D. M. Goldschlag, and S. G. Stubblebine, "Publicly verifiable lotteries: Applications of delaying functions," In International Conference on Financial Cryptography, pp. 214-226. Springer, Berlin, Heidelberg, 1998. Retrieved from internet using: http://citeseerx.ist.psu.edu/viewdoc/download?doi=10.1.1.53.2848dep=rep1&type=pdf.

(Continued)

*Primary Examiner* — Lynn D Feild
*Assistant Examiner* — Dereena T Cattungal

(57) ABSTRACT

An example operation may include one or more of generating an initial seed and allocating one or more authorized bits of the initial seed to a plurality of blocks in a distributed ledger, storing the initial seed and an identification of which authorized bits of the initial seed are allocated to each block of the distributed ledger, receiving a final seed value that is partially generated by each of a plurality of nodes configured to access the distributed ledger based on authorized bits of respective blocks updated by each respective node, and generating a random sequence value based on the final seed value and storing the random sequence value in a block of the distributed ledger.

19 Claims, 13 Drawing Sheets

(56) References Cited

U.S. PATENT DOCUMENTS

| | | | |
|---|---|---|---|
| 9,270,455 B1* | 2/2016 | Ts'o | H04L 9/0872 |
| 2010/0002877 A1* | 1/2010 | Zhang | H04L 9/0662 |
| | | | 380/46 |
| 2010/0121896 A1* | 5/2010 | Oram | H04L 9/0662 |
| | | | 708/250 |
| 2016/0366106 A1 | 12/2016 | Smith et al. | |
| 2016/0379212 A1* | 12/2016 | Bowman | H04L 9/3239 |
| | | | 705/71 |
| 2018/0247191 A1* | 8/2018 | Katz | G06Q 20/065 |
| 2020/0162264 A1* | 5/2020 | Zamani | H04L 9/3297 |

OTHER PUBLICATIONS

L. M. Goodman, "Tezos—a self-amending crypto-ledger White paper," (2014). Retrieved from Internet using: https://cdn.relayto.com/media/files/wMfrXRbQogudZech3tBA_white_paper.pdf.

Quanta, "Quanta Lottery", white paper, vol. 5, Oct. 26, 2017, pp. 1-23.

Randao ORG., "Randao: Verifiable Random Number Generation", Sep. 11, 2017, pp. 1-24.

* cited by examiner

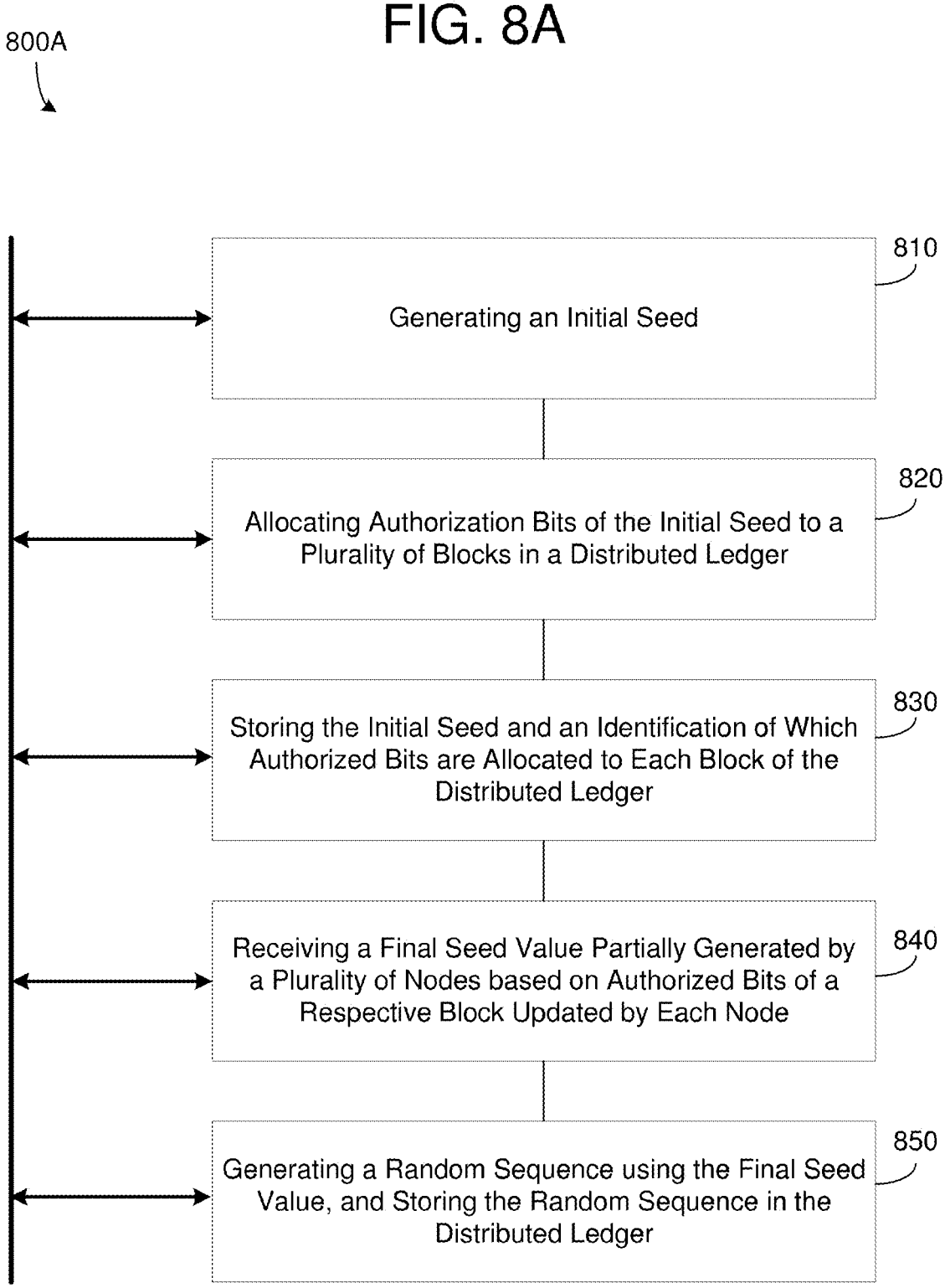

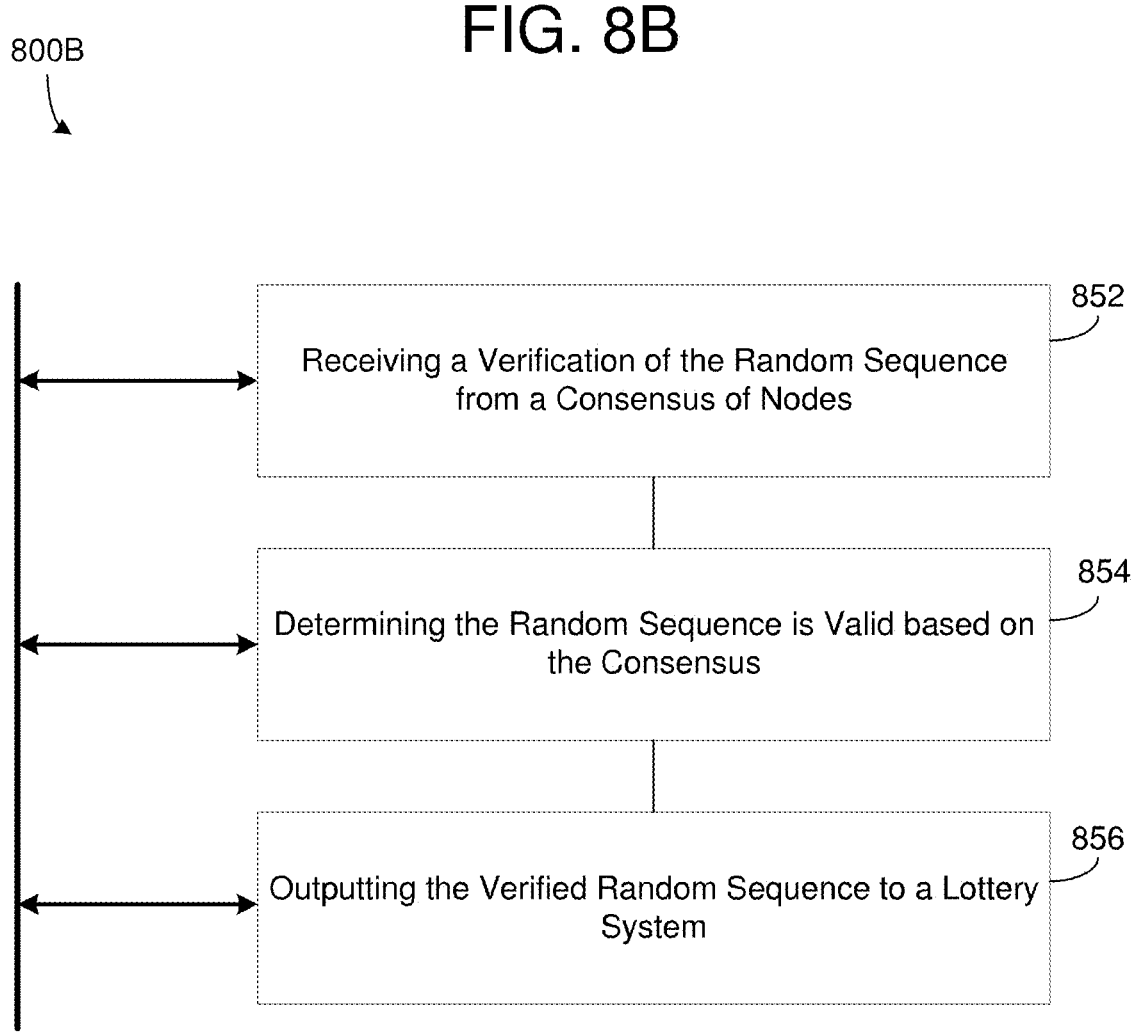

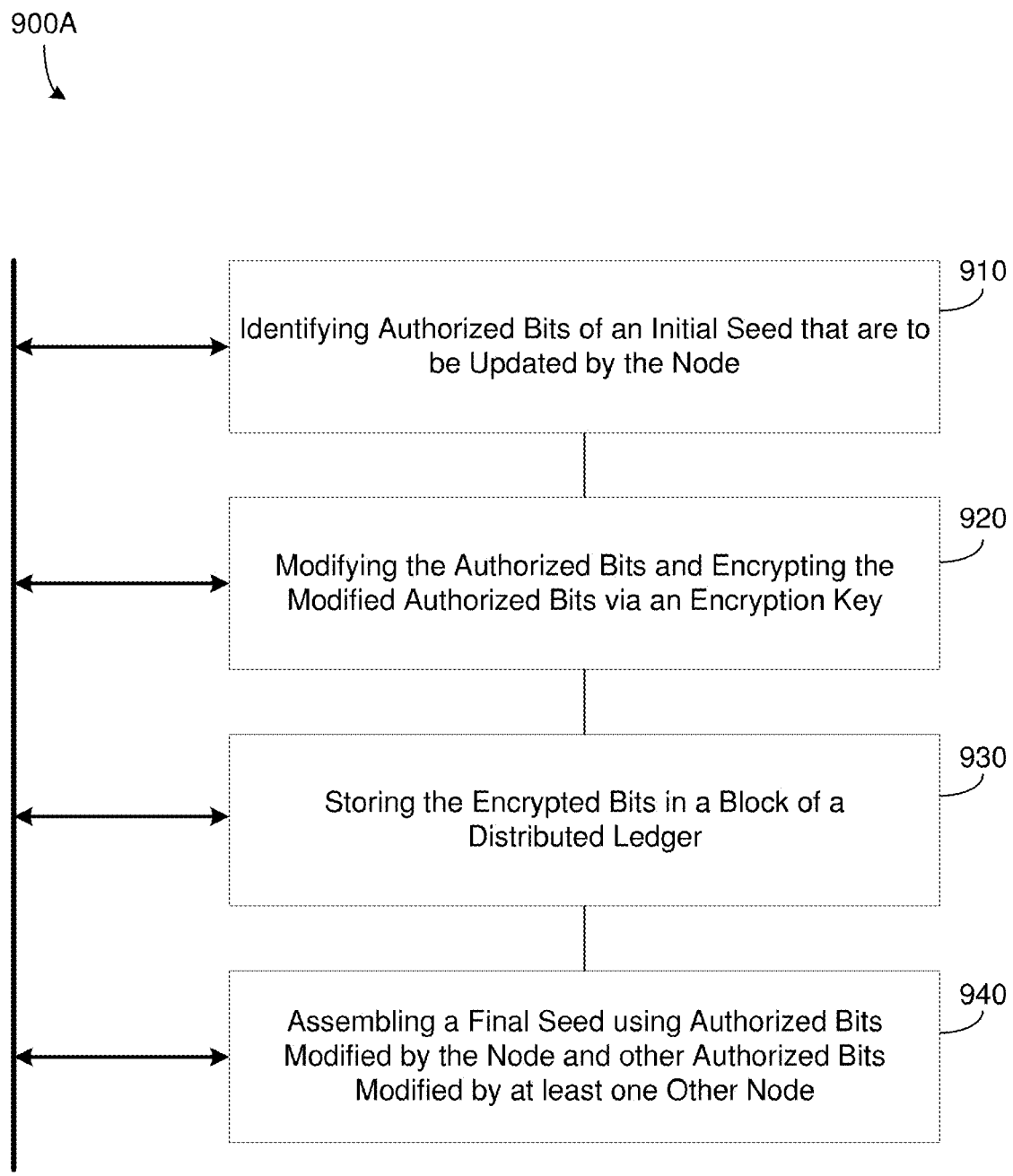

DISTRIBUTED LEDGER FOR GENERATING AND VERIFYING RANDOM SEQUENCE

TECHNICAL FIELD

This application generally relates to a distributed ledger such as a blockchain system, and more particularly, to a lottery distributed ledger network that generates and verifies a lottery number via a decentralized distributed network of distributed ledger nodes rather than through a centralized host.

BACKGROUND

A distributed Ledger is a continuously growing list of records that typically apply cryptographic techniques such as storing cryptographic hashes relating to other blocks. A blockchain is one common instance of a distributed ledger. Although, often used for financial transactions, a distributed ledger such as a blockchain can store various other types of information such as information related to goods and services (i.e., products, packages, status, etc.). A decentralized scheme provides authority and trust to a decentralized network and enables its nodes to continuously and sequentially record their transactions on a public "block", creating a unique "chain" referred to as a distributed ledger. Cryptography, via hash codes, is used to secure an authentication of a transaction source and removes a central intermediary. The records stored on the distributed ledger can be secured from tampering and revision due to their immutable properties. Each block contains a timestamp and a link to a previous block. The distributed ledger can be used to hold, track, transfer and verify information. Since the ledger is a distributed system, before adding a transaction to the distributed ledger, peers need to reach a consensus status.

Lottery systems are commonly used to grant privileges to a user such as the privilege of a license plate (in some jurisdictions). As another example, lottery systems are used for determining prize winners, and the like. Currently, a host organization of a lottery system generates and announces a lottery result, and relies on a third party's supervision to guarantee the validation of the result. The conventional lottery process is centrally operated by the organization and is subject to accountability only to the third party's supervision. Because of this, the fairness of the lottery result is dependent on the organization's credibility and the third party's supervision. However, the lack of oversight can lead to fraud and other nefarious behavior. As such, what is needed is a lottery system that is more secure and regulated without leaving the accountability of the lottery to one or two entities.

SUMMARY

One example embodiment may provide an organizing node system that includes at least one of a processor configured to generate an initial seed, allocate one or more authorized bits of the initial seed to each of a plurality of blocks in a distributed ledger, and store the initial seed and an identification of which authorized bits of the initial seed are allocated to each block among the plurality of blocks of the distributed ledger, and a network interface configured to receive a final seed value that is partially generated by each of a plurality of nodes configured to access the distributed ledger based on authorized bits of respective blocks updated by each respective node, wherein the processor is further configured to generate a random sequence based on the final seed value and store the random sequence in a block of the distributed ledger.

Another example embodiment may provide a method that includes at least one of generating an initial seed and allocating one or more authorized bits of the initial seed to a plurality of blocks in a distributed ledger, storing the initial seed and an identification of which authorized bits of the initial seed are allocated to each block of the distributed ledger, receiving a final seed value that is partially generated by each of a plurality of nodes configured to access the distributed ledger based on authorized bits of respective blocks updated by each respective node, and generating a random sequence value based on the final seed value and storing the random sequence value in a block of the distributed ledger.

Another example embodiment may provide a network node system that includes at least one of a processor configured to identify authorized bits of an initial seed which are uniquely allocated to a block stored in a distributed ledger accessed by a plurality of nodes, modify the identified authorized bits of the initial seed, encrypt the modified authorized bits using an encryption key of the node, and store the encrypted authorized bits in a block of the distributed ledger which includes a block of authorized bits updated by at least one other node, wherein a final seed is capable of being assembled using authorized bits modified by the node and other authorized bits modified by the at least one of the plurality of nodes stored in the distributed ledger.

Another example embodiment may provide a method that includes at least one of identifying authorized bits of an initial seed which are uniquely allocated to a block stored in a distributed ledger accessed by a plurality of nodes, modifying the identified authorized bits of the initial seed and encrypting the modified authorized bits using an encryption key of the network node, storing the encrypted authorized bits in a block of the distributed ledger that includes a block of authorized bits updated by at least one other node, wherein a final seed is capable of being assembled using the authorized bits modified by the node and other authorized bits modified by at least one other node stored in the distributed ledger.

A further example embodiment may provide a non-transitory computer readable medium comprising instructions, that when read by a processor, cause the processor to perform at least one of generating an initial seed and allocating one or more authorized bits of the initial seed to a plurality of blocks in a distributed ledger, storing the initial seed and an identification of which authorized bits of the initial seed are allocated to each block of the distributed ledger, receiving a final seed value that is partially generated by each of a plurality of nodes configured to access the distributed ledger based on authorized bits of respective blocks updated by each respective node, and generating a random sequence value based on the final seed value and storing the random sequence value in a block of the distributed ledger.

BRIEF DESCRIPTION OF THE DRAWINGS

FIGS. 8A and 8B are diagrams illustrating methods of an organizing node in a lottery distributed ledger network, according to example embodiments.

FIGS. 9A and 9B are diagrams illustrating methods of a network node in a lottery distributed ledger network, according to example embodiments.

DETAILED DESCRIPTION

Figure 1:
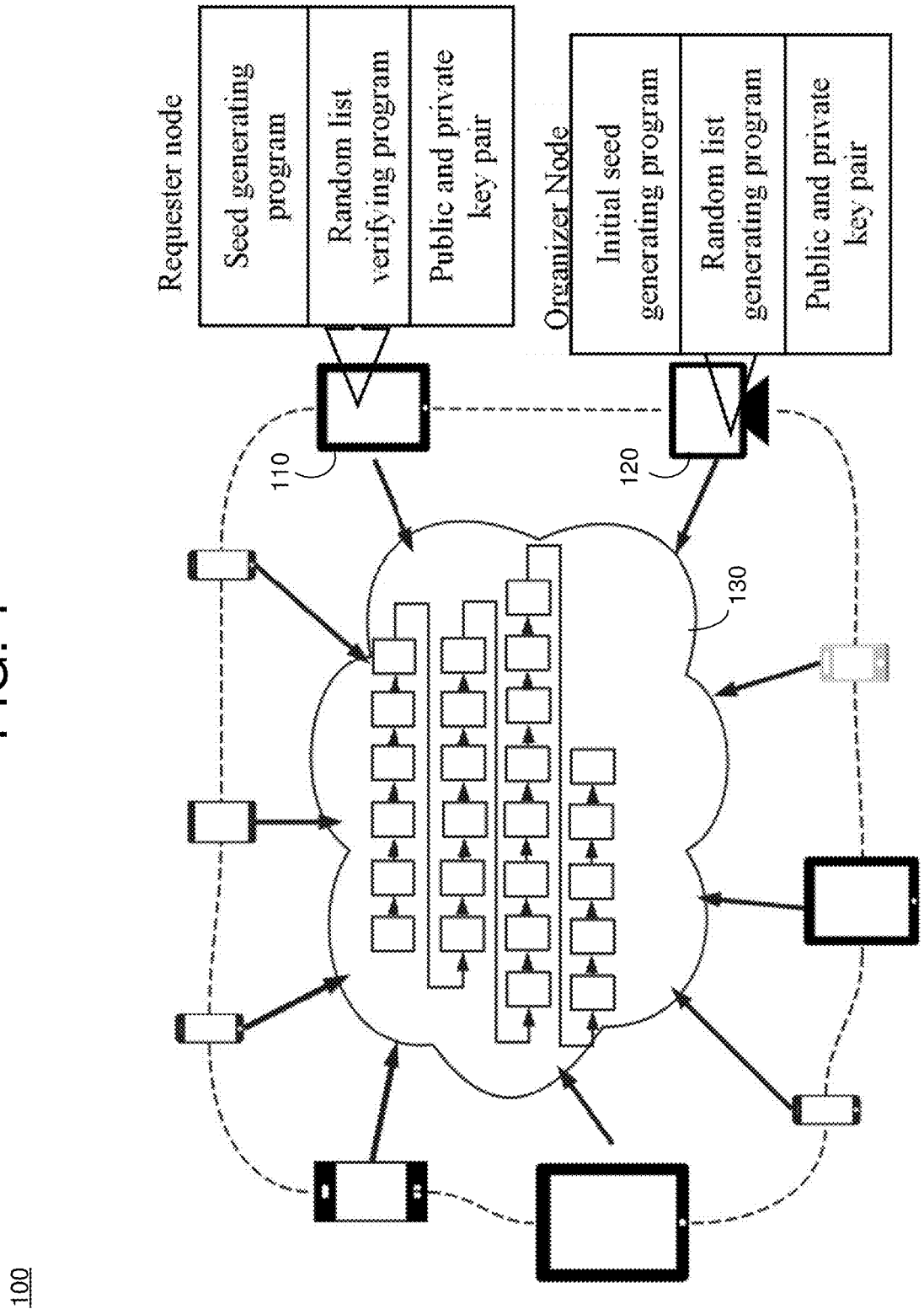
FIG. 1 is a diagram illustrating a lottery distributed ledger network system, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a distributed ledger for a lottery network system. In some examples, the distributed ledger is a blockchain, however embodiments are not limited thereto. The lottery network includes nodes (or peers) such as one or more organizing nodes and one or more requesting nodes (also referred to herein as network nodes) which are connected to each other via one or more networks such as the Internet, a private network, and the like. As an example, the organizing node may be a lottery organizer and the network node may be a participant in the lottery. According to various aspects, the lottery network is fair in that no central organization or entity can control or manipulate the final result stored via the distributed ledger. In addition, the random lottery sequence generation process is transparent because each participant node is involved throughout the phases of the generating and verifying of the lottery numbers. Furthermore, the lottery network of nodes is efficient because there is no need for a third party supervision.

A ledger is commonly defined as an account book of final entry, in which transactions are recorded. Ledgers can be stored on paper or electronically on a computer. A distributed ledger is a ledger that is replicated in whole or in part among multiple computers. In this example, each computer may participate in and record or otherwise store a decentralized or distributed database which serves as the ledger whereby records of transactions are stored and cryptography is used to store and update transactions. A distributed ledger can include cryptographic properties that facilitate security and accountability. For example, a distributed ledger may have its transactions become irreversible because once a transaction is recorded, cryptography ensures that it cannot be reversed. A distributed ledger with cryptographic properties may also provide accessibility because any party can access the distributed ledger in whole or in part. A distributed ledger with cryptographic properties may also be chronological and time-stamped which lets all participating entities know when a transaction was added to the ledger. A distributed ledger with cryptographic properties may also be consensus-based in that a transaction is added only if it is approved, typically unanimously, by parties on the network. A distributed ledger with cryptographic properties may also provide verifiability because all transactions can be cryptographically verified. A blockchain is an example of a distributed ledger with cryptographic properties. While the description and figures below are described in terms of a blockchain, the instant application applies equally to any distributed ledger with cryptographic properties.

Rather than the lottery numbers being generated by a single entity alone, the lottery number is generated through a distributed process whereby both an organizing node and a plurality of network nodes participate and supervise in the generation and verification phases of the lottery result. For example, the organizing node and the network nodes may participate in a distributed process via a distributed ledger such as a seed blockchain to generate a seed (numerical value) which is the input used for generating a random sequence (lottery numbers). During this initial process, the network nodes each generate a portion of the final seed value based on bits of an initial seed value distributed by the organizing node. Each network node is authorized to modify a specific portion of bits within the initial seed (referred to herein as authorized bits) and store the updated portion in a corresponding block of the distributed ledger. The bits are updated and may be stored on the distributed ledger which is replicated across all nodes. The different bits updated by the different network nodes may be combined by any of the nodes to generate an entire final seed. After the final seed is generated, the organizing node generates a random sequence using the final seed as an input, and each of the network nodes verify the random sequence based on the final seed. If a consensus of network nodes verify the random sequence, the random sequence may be output as a lottery result.

The lottery generation process may involve a first distributed process of generating the seed value via a the distributed ledger and a second distributed process of generating and verifying a random sequence via a distributed ledger. In some examples, the same distributed ledger may be used for both the first process and the second process, or different ledgers may be used. In some of the examples herein, a seed blockchain is used to generate the initial seed while a verification blockchain is used to verify a lottery result, however, embodiments are not limited thereto. A copy of the distributed ledger may be stored by each node in the lottery network. Each network node may register with the network and interact with other nodes based on a peer-to-peer protocol, such as a remote procedure call (e.g., RPC, gRPC, etc.) The communication protocol among the nodes may be implemented by the system.

In some of the examples provided below, the distributed ledger is a blockchain.

However, it should be appreciated that the examples below in which a blockchain is used may be replace the blockchain with any distributed ledger such as a distributed ledger with cryptographic properties. That is, the distributed ledger may not be a blockchain but may be another type of distributed ledger that is known or that becomes known. In these examples, different blockchain systems may be based on different communication protocols, such as Hyperledger, Ethereum, Ripple, and the like. The underlying distributed ledger system can guarantee each node has a full copy of all the information of the blocks or other storage means included in the distributed ledger.

FIG. 1 illustrates a lottery distributed ledger network system 100, according to example embodiments. The nodes in the lottery distribute ledger network system 100 are connected via a star network topology, in the example. Referring to FIG. 1, the system 100 includes an organizing node 120 and a plurality of network nodes 110, also referred to as requesting nodes. As an example, the organizing node 120 may be a lottery host and the network nodes 110 may be participants who desire to win the lottery. In this example, there may be hundreds of lottery participants (e.g., 200 participants, etc.) Each of the organizing node 120 and the network nodes 110 have software installed therein to generate a random sequence of lottery numbers. The primary input of the software is a seed value. Therefore, the first step in the lottery number generation process is to generate a seed value.

According to various aspects, the organizing node 120 generates an initial seed value. The initial seed is a string of bits such as tens, hundreds, thousands, or like, of bits. Within the initial seed value, each network node 110 is allocated a fragment or a small subsection of bits referred to as authorized bits. The authorized bits for each network node 110 may be unique or mutually exclusive from the authorized bits of other network nodes 110. The initial seed value may be transmitted to the network nodes 110 or it may be stored by the organizing node 120 via a distributed ledger (e.g., distributed ledger 130) where it is accessed by the network nodes 110. The organizing node 120 also allocates a partial bit value from the initial seed (authorized bits) to each block in advance. The authorized bits (position) of the initial seed are unique to each block and identify which authorized bits of the initial seed value are to be updated by the network node 110 associated with the respective block. Each network node 110 updates the authorized bits associated with their respective block and stores the updated version of the authorized bits as a block in the distributed ledger 130. To keep the updated bit values secure, each network node 110 may encrypt the bit values with a private key of the respective network node 110.

When all nodes have updated and stored respective authorized bits in a block in the distributed ledger 130, a timing event has expired, or some other condition, the network nodes 110 may share public keys with each other and with the organizing node 120 thereby enabling all nodes to decrypt the encrypted updated authorized bits and assemble a final seed value from all of the blocks stored on the distributed ledger 130. By generating the final seed via a distributed process involving both the organizing node 120 and the network nodes 110, the final seed value is accountable to all nodes in the network 100. Next, the organizer node 120, also referred to as an organizing node, may generate a list of lottery numbers (also referred to as a public list or random sequence) with a pseudo-random number generator software and the seed generated by the network nodes 110. In addition, each network node 110 may generate a list of lottery numbers (also referred to as a private list) with the pseudo-random number generator software. A network node 110 may compare the public list which is generated by organizer node 120 and the private list which is generated by the node itself. If they are the same, the list is confirmed. Next, the lottery numbers may be output by either of the organizing node 120 or the network node 110.

The purpose of the lottery network system 100 is to prevent fraud. In a traditional centralized lottery, the lottery organizer generates lottery number itself and is not accountable to anyone other than possibly a third party supervisor. Therefore, there is a possibility of fraud. In the lottery network system 100 according to various embodiments described herein, each participant (both organizer node 110 and network nodes 120) are involved in the end-to-end process of generating lottery number, so no participant can control and manipulate the result. For example, each participant can store and access a distributed ledger such as a blockchain or other distributed ledger with cryptographic properties. Through the ledger, a secure seed value may be generated, and a secure lottery number may be generated based on the seed value.

A distributed ledger network is a distributed system consisting of multiple nodes that communicate with each other. A blockchain node runs programs called chaincode (e.g., smart contracts, etc.), holds state and ledger data, and executes transactions. Transactions are operations invoked on the chaincode. Transactions typically must be "endorsed" and only endorsed transactions may be committed and have an effect on the state of the blockchain. There may exist one or more special chaincodes for management functions and parameters, collectively called system chaincodes.

Nodes are the communication entities of the blockchain system. A "node" is a logical function in the sense that multiple nodes of different types can run on the same physical server. Nodes are grouped in trust domains and associated to logical entities that control them in various ways. Nodes may include different types such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain the state and a copy of the ledger. Peers can also have the role of an endorser, although it is not a requirement. An ordering-service-node or orderer is a node running the communication service for all nodes and which implements a delivery guarantee, such as atomic or total order broadcast to each of the peer nodes in the system when committing transactions and modifying the world state.

A distributed ledger is a sequenced, tamper-resistant record of all state transitions of a network of nodes. State transitions are a result of chaincode invocations (i.e., transactions) submitted by participating parties (e.g., client nodes, ordering nodes, endorser nodes, peer nodes, etc.) A transaction may result in a set of asset key-value pairs that are committed to the ledger as creates, updates, deletes, and the like. The distributed ledger may include a blockchain (also referred to as a chain) and may store an immutable, sequenced record in blocks. The distributed ledger may also include a state database which maintains a current state of the distributed ledger. There is typically one distributed ledger associated with each channel. Each peer node maintains a copy of the distributed ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the distributed ledger may be sequenced and cryptographically linked together. Accordingly, it is not possible to tamper with the distributed ledger data without breaking the hash links. A hash of a most recently added block represents every transaction on the chain that has come before it, making it possible to ensure that all peer nodes are in a consistent and trusted state. The chain may be stored on the peer node file system (local, attached storage, cloud, etc.), efficiently supporting the append-only nature of the distributed ledger network workload.

The current state of the distributed ledger represents the latest values for all keys that are included in the chain transaction log. Because the current state represents the latest key values known to the channel, it is sometimes referred to as a world state. Chaincode invocations execute transactions against the current state data of the distributed ledger. To make these chaincode interactions efficient, the latest values of the keys may be stored in the state database. The state database may be simply an indexed view into the chain's transaction log, it can therefore be regenerated from the chain at any time. The state database may automatically get recovered (or generated if needed) upon peer node startup, and before transactions are accepted.

Figure 2A:
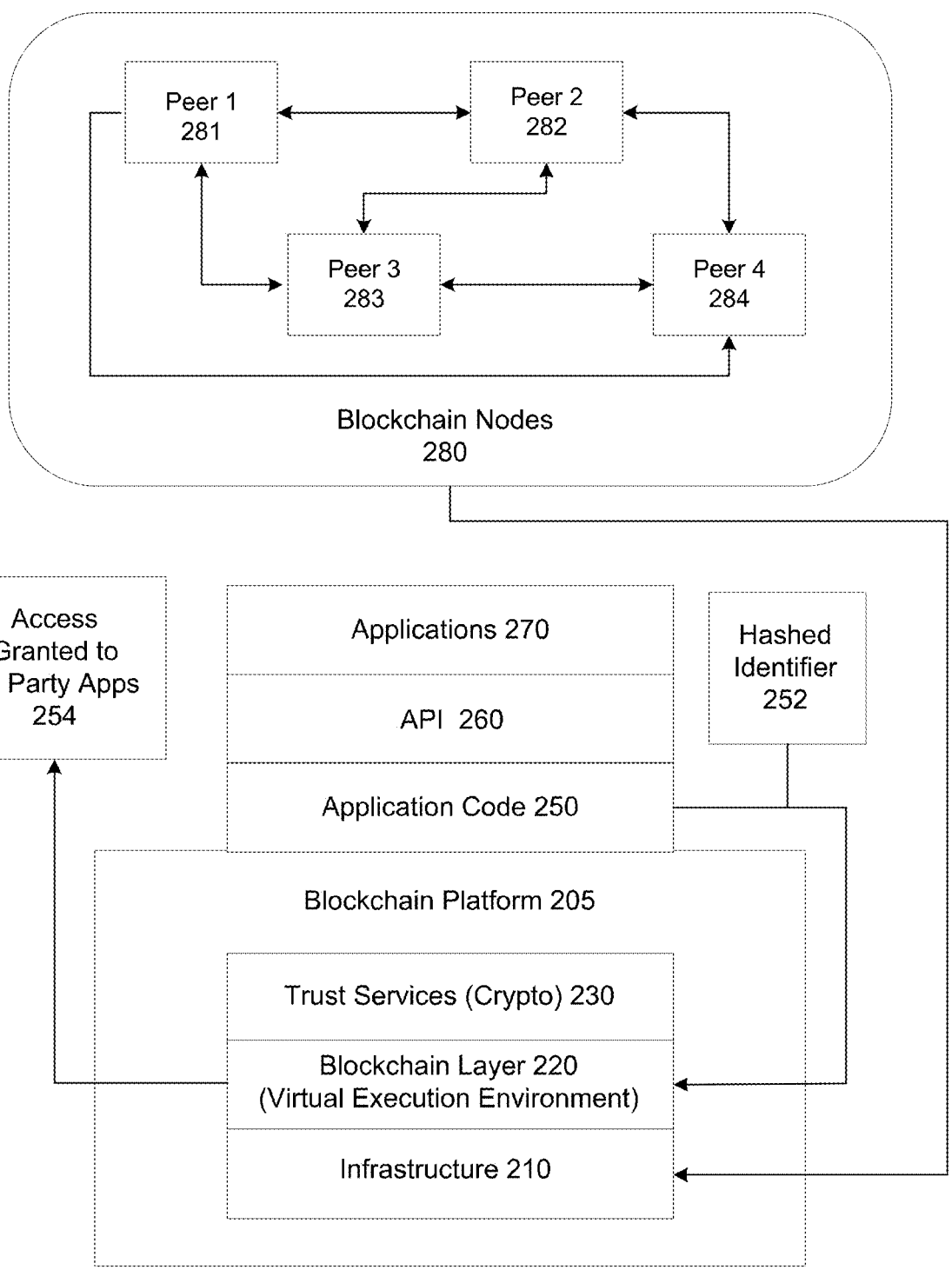
FIG. 2A is a diagram illustrating a peer node blockchain architecture configuration for an asset sharing scenario, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-281 may provide an ordering service for all blockchain nodes in the architecture 200A. A blockchain node may initiate a blockchain authentication and seek to write to a blockchain ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. This can be deployed as a transaction and installed, via appending to the blockchain ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the blockchain ledger. For example, hashed identifier information 252 received from a client device may be processed by one or more processing entities (e.g., virtual machines) included in the blockchain layer 220. The result may include access being granted 254 to a third party application from the blockchain computing environment. In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, and then written to a block in the blockchain. The smart contract may include executable code which is registered, stored, and/or replicated within a blockchain (e.g., decentralized network of blockchain peers). A transaction is an execution of the smart contract code which can be performed in response to conditions associated with the smart contract being satisfied. The executing of the smart contract may trigger a trusted modification(s) to a state of the blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, the release and acquire smart contract information may be updated 222 according to the specifications of the entities providing asset services. One function may be to provide the requesting entity, in this example entity #2 with access 224 to the asset if the entity #2 has the correct credentials and the expiration date has not yet matured and is still in an active or pending status (i.e., before the expiration date). The correct credentials are required and the smart contracts conditions must be satisfied prior to releasing the asset access information.

Figure 2B:
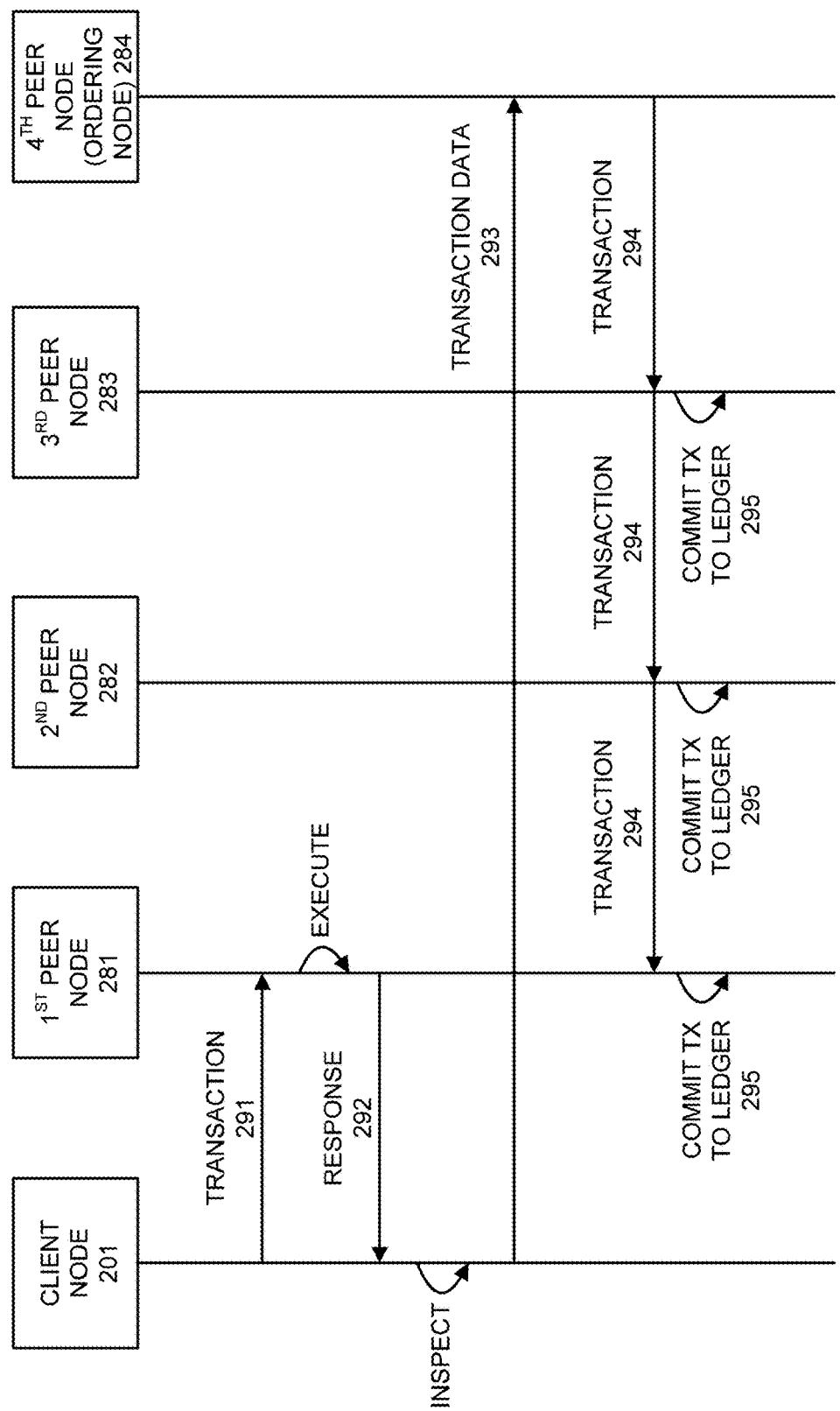
FIG. 2B is a diagram illustrating a peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal sent by an application client node 201 to an endorsing peer node 281. The endorsing peer 281 may verify the client signature, and execute a chaincode function to simulate the transaction. The output is the chaincode results, a set of key/value versions that were read in the chaincode (read set), and the set of keys/values that were written in chaincode (write set). The proposal response gets sent back to the client 201 along with an endorsement signature. The client assembles the endorsements into a transaction payload and broadcasts it to an ordering service node 284. The ordering service node 284 then delivers ordered transactions as blocks to all peers 281-283 on a channel. Before committal, each peer 281-283 may validate the transactions. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a request to the peer node 281 which is an endorser. The client 201 may include an application leveraging a supported software development kit (SDK) such as Node, Java, Python, and the like, which utilizes an available API to generate a transaction proposal. The proposal is a request to invoke a chaincode function so that data can be read and/or written to the blockchain ledger (i.e., write new key value pairs for the assets). The SDK may serve as a shim to package the transaction proposal into a properly architected format (e.g., protocol buffer over gRPC) and take the client's cryptographic credentials to produce a unique signature for this transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the blockchain ledger at this point. In step 292, the set of these values, along with the endorsing peer node's 281 signature is passed back as a proposal response to the SDK of the client 201 which parses the payload for the application to consume.

In response, the application of the client 201 inspects/verifies the endorsing peers signatures and compares the proposal responses to determine if the proposal response is the same. If the chaincode only queried the blockchain ledger, the application would inspect the query response and would typically not submit the transaction to the ordering service 284. If the client application intends to submit the transaction to ordering service 284 to update the blockchain ledger, the application determines if the specified endorsement policy has been fulfilled before submitting (i.e., did peer nodes necessary for the transaction both endorse). Here, the client may include only one of multiple parties to the transaction. In this case, each client may have their own endorsing node, and each endorsing node will need to endorse the transaction. The architecture is such that even if an application chooses not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation; it may simply receive transactions from all channels in the network, order them chronologically by channel, and create blocks of transactions per channel.

In step 294, the blocks of the transaction are delivered from the ordering node 284 to all peer nodes 281-283 on the channel. The transactions within the block are validated to ensure endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain (or other distributed ledger), and for each valid transaction the write sets are committed to current state database. An event is emitted, to notify the client application that the transaction (invocation) has been immutably appended to the chain, as well as notification of whether the transaction was validated or invalidated.

Figure 3:
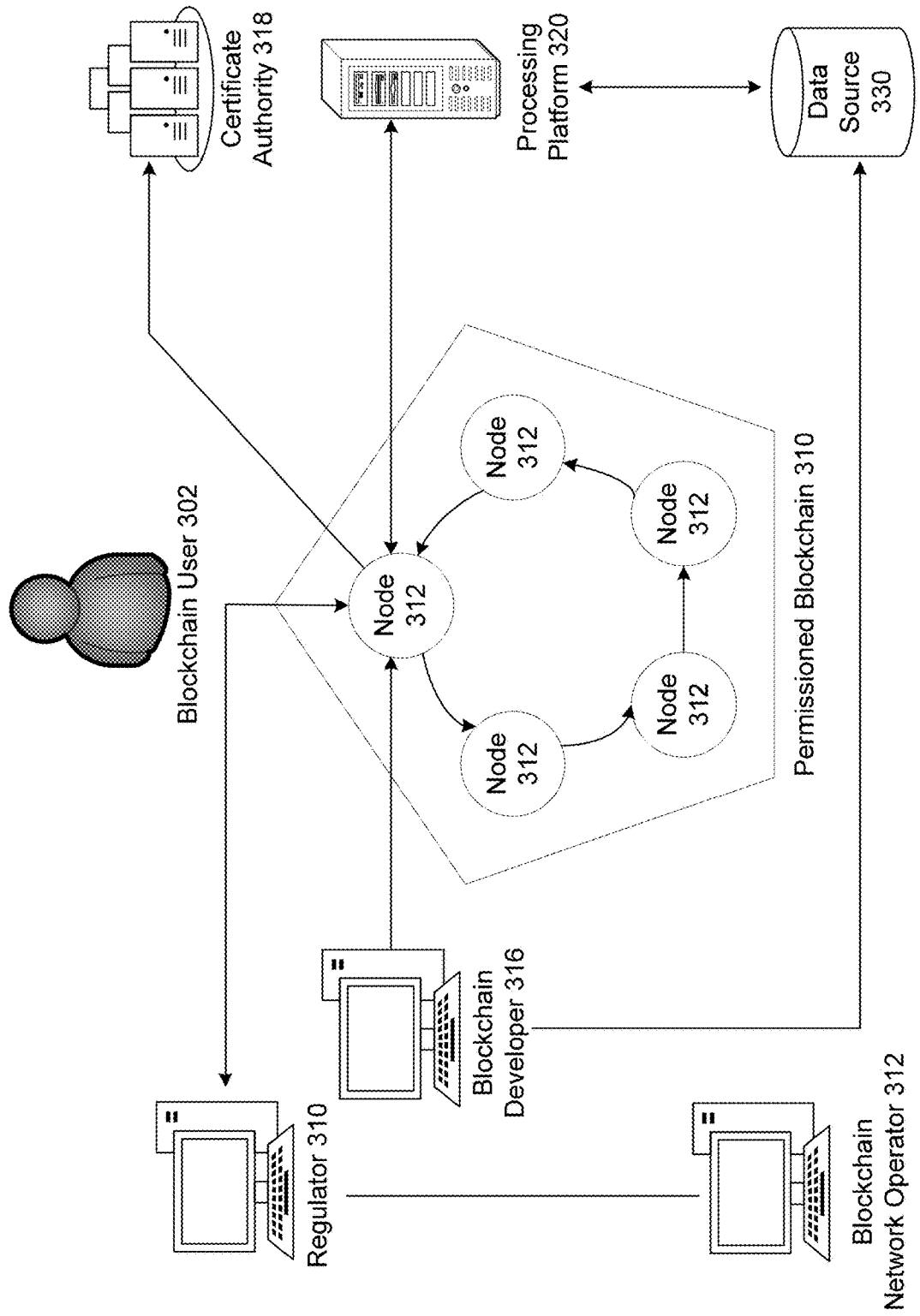
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. The transaction can be a deploy, invoke or query, and may be issued through a client-side application leveraging an SDK, directly through a REST API, or the like. Trusted business networks may provide access to regulator systems 310 such as auditors (the Securities and Exchange Commission in a U.S. equities market, for example). Meanwhile, a blockchain network operator system 312 manages member permissions such as enrolling the regulator system 310 as an "auditor" and the blockchain user 302 as a "client." An auditor could be restricted only to querying the blockchain ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
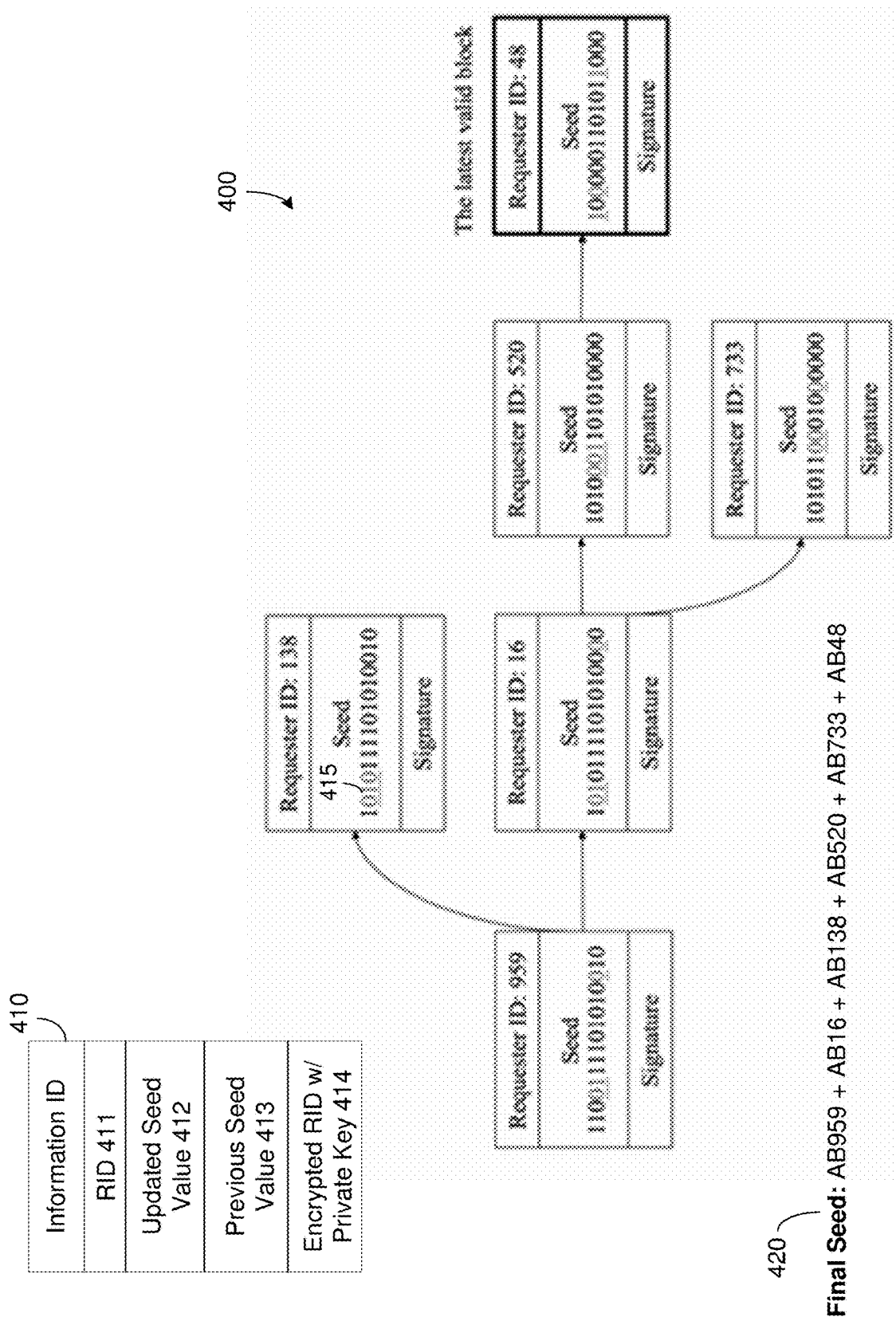
FIG. 4 is a diagram illustrating a distributed ledger for generating a seed for a lottery, according to example embodiments.
Figure 5:
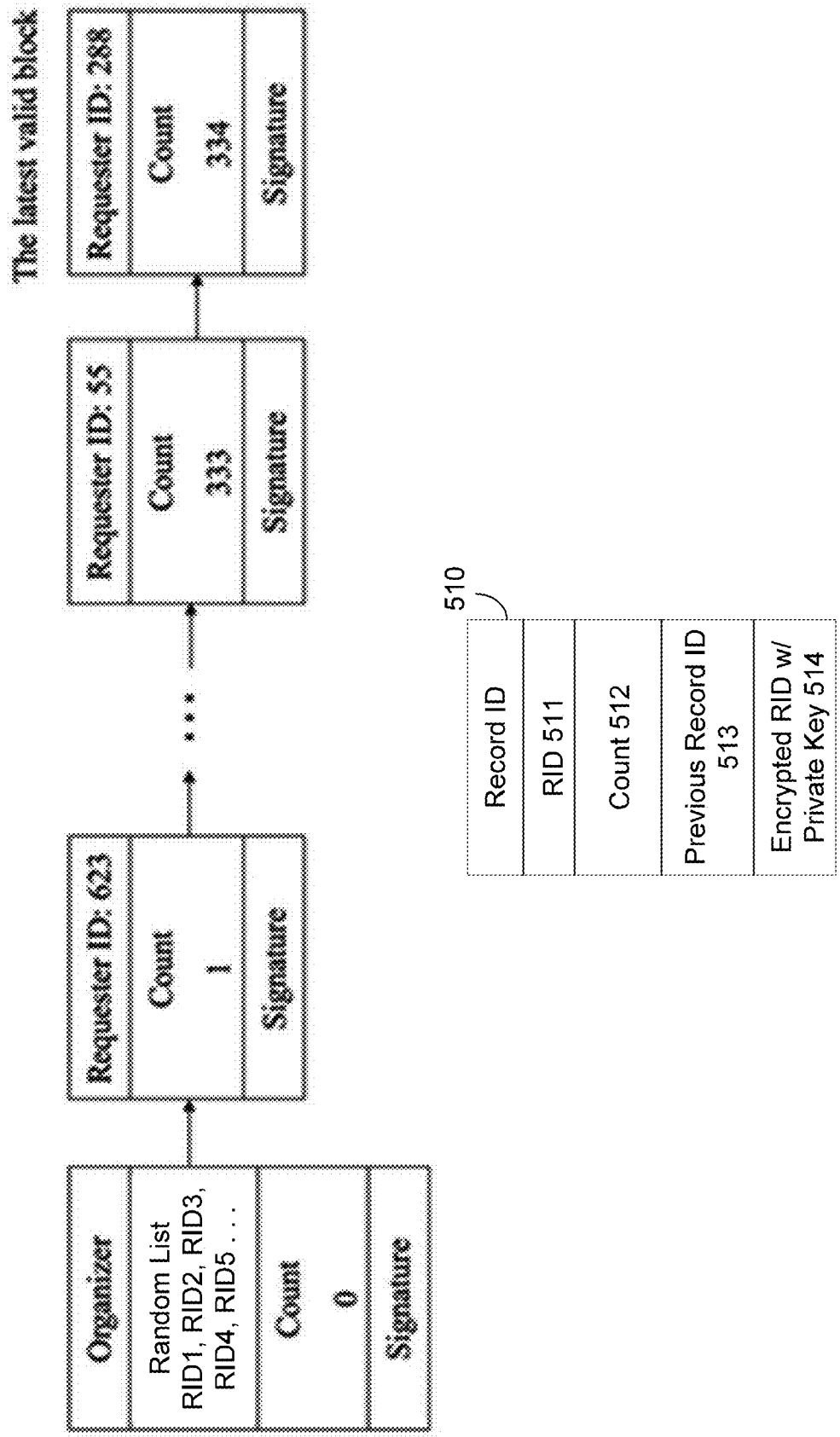
FIG. 5 is a diagram illustrating a distributed ledger for verifying a generated lottery number, according to example embodiments.

According to various embodiments, the lottery distributed ledger network may include and store multiple distributed ledgers such as a seed blockchain used for generating a seed value and a verification blockchain used to verify a lottery sequence generated via the seed value. Each distributed ledger may store similar information with some differences. FIG. 4 illustrates an example of a distributed ledger 400 for generating an seed value and FIG. 5 illustrates an example of a distributed ledger 500 for verifying a lottery number sequence.

The distributed ledger 400 may be used by the nodes to generate a seed value for a lottery number generation program, according to example embodiments. FIG. 4 also illustrates an example of block 410 that may be stored within the distributed ledger 400. The distributed ledger 400 may be used by nodes of the lottery distributed ledger network 100 shown in FIG. 1 to generate a final seed value which is to be used to generate a sequence of lottery numbers or random sequence. In the examples, the RID is a Request ID which is a unique identify representing a node in the lottery distributed ledger system. The seed is the only input to a software program for generating the random sequence of lottery numbers. The public key (Kpu) and the private key (Kpri) are a pair of asymmetric keys which may be assigned to a node. Each private key may be maintained by the node while the public key may be shared to other nodes to enable the other nodes to decrypt data of the node stored on the distributed ledger 400.

In FIG. 4, an example data block 410 stored in a sequence of blocks on the distributed ledger 400 includes an information ID identifying the block, a request ID 411 identifying the network node that is to update the block 410, an updated seed value 412 representing the updated authorized bits of the initial seed value, a previous seed information ID 413 representing the previous value of the seed, and an encrypted RID encrypted using the private key of the network node corresponding to the request ID 411. The updated seed value 412 are bits of the initial seed value allocated to the data block 410 which are authorized for being updated (authorized bits 415) by the respective network node corresponding to the request ID 411. The authorized bits 415 may be allocated to the data block 410 by the organizing node when the initial seed is generated and provided to all network nodes. As shown in the example of FIG. 4, the authorized bits 415 are represented by underling. The authorized bits are different for each block among the plurality of blocks on the distributed ledger 400. Also, the amount of authorized bits allocated to each block may be different or it may be the same. In FIG. 4, each block (and therefore each network node) is allocated 3 authorized bits. The amount of authorized bits allocated to each block may be determined based on a total size of the initial seed and the number of network nodes.

Before generating the final seed value, a map of the data blocks on the distributed ledger 400 and the corresponding seeds may be distributed to all of the network nodes. The generation of the final seed value may be performed according to multiple steps. For example, the organizer node may generate an initial seed value and submit the initial seed information to the distributed ledger network. When a network node tries to update the initial seed, the network node identifies which authorized bits of the initial seed are allocated to the respective block associated with the network node. The network node may then generate a random numeric value as the authorized bits S(RID) value (e.g. By getting a time stamp). The network node may construct seed information by placing RID, the updated seed value, and the previous seed information ID into a block. Then attach the RID within the Seed Information and submit the encrypted seed information encrypted using the Kpri(RID) to the distributed ledger. At some point, all the network nodes may submit their corresponding Kpu(RID) to the distributed ledger to enable the other network nodes to decrypt the encrypted authorized bits provided by the other network nodes. Then every node can decrypt the changed bits value in the blocks to get the final seed value.

The authorized bits are a portion or a part of the bits of the initial seed which can only be updated by the authorized network node for that block. The organizing node may assign the authorized bits to a block based on the following: for N bits long seed value, i bits of them are authorized bits; all of the possible authorized bits are C'N, represented by $s[0], s[1] \ldots s[K]$. ($K=C^i_N-1$); the authorized bits sequence is submitted to the distributed ledger along with the initial seed value. In response, each network node may use a pseudo-random generator (PRNG) to generate a random index value X according to the block number. The authorized bits s[X] is determined. When a network node receives an identification of the authorized bits allocated to the block associated with the network node, it can update the respective authorized bits of the seed and post the updated seed as a new block to the distributed ledger 400. Here, the authorized node can only update its authorized bits, and no one can manipulate and foresee the final result of the seed value.

FIG. 5 illustrates the distributed ledger 500 for verifying a generated lottery number sequence, according to example embodiments. FIG. 5 also illustrates an example of a block 510 that may be stored within the distributed ledger 500. In this example, the block 510 may include a record ID identifying the record in the distributed ledger 500, a RID 511 of the node, a count of records 512, a previous record ID and information 513, and encrypted RID information 514 that is encrypted with a private key of the node corresponding to the RID 511.

Before the verification stage, the software program to generate the random sequence should be distributed to all of the network nodes. The seed may be the only input of the program when generating the lottery number sequence. Initially, the organizer node will generate a random sequence based on the final seed value generated via the distributed ledger 500. The random sequence may be distributed to all the network nodes and may be referred to as a public list of numbers. Each network node may then verify the random sequence generated by the organizing node by processing the same final seed value using the software program to determine whether the random sequence generated by the organizing node is correct. If the network node verifies the random sequence, the network node may transmit notification to the organizing node. When the organizing node receives a consensus of verifications (e.g., more than 50%) the organizing node determines that the random sequence has been approved. Accordingly, the random sequence can be output by either of the organizing node and/or the network nodes as a lottery number.

For example, each network node may verify if the final seed value is correct by receiving or otherwise retrieve the random sequence from the distributed ledger network. The node may verify each requester node on the distributed ledger by decrypting the RID with Kpu(RID) and check whether the RID is the organizer's RID. The node may verify if changed seed bits are authorized in the distributed ledger. The node may pseudo-random generator (PRNG) to generate the random index value X according to the block number. The authorized bits s[X] is determined. Check if the changed bits in the block comply with the authorized bits s[X].

As another example, each network node may verify the random sequence generated by the organizing node using the final seed. For example, the node may generate the random sequence by executing the program with the generated final seed. The node may verify the random sequence from the distributed ledger network with the generated random sequence (e.g. by comparing the hash value of the random sequence from the distributed ledger network with the hash value of the generated random sequence). If all of the above verifications succeed, the network node may get the count number of the verification records from the latest valid verification record. Then the node may increase the count number by 1, construct the verification record by placing the count number of the verification records, the RID, the previous verification record Id and the encrypted RID with Kpri(RID), and submit the constructed Verification Record to the distributed ledger network. When the block containing the verification record is generated, the distributed ledger system may verify the requester of the verification record by decrypting and checking the encrypted RID, and check whether the count number of the verification records is acceptable by checking whether the increment of the count number is 1. When the above verification succeeds, the verification record may be recorded in the block and the verification record Id may be generated. Finally, the latest valid verification record in the distributed ledger network contains the total count number of the verification records. When the count number is greater than the 50% of the requesters of the lottery system, the verification of the requester list succeed.

Figure 6A:
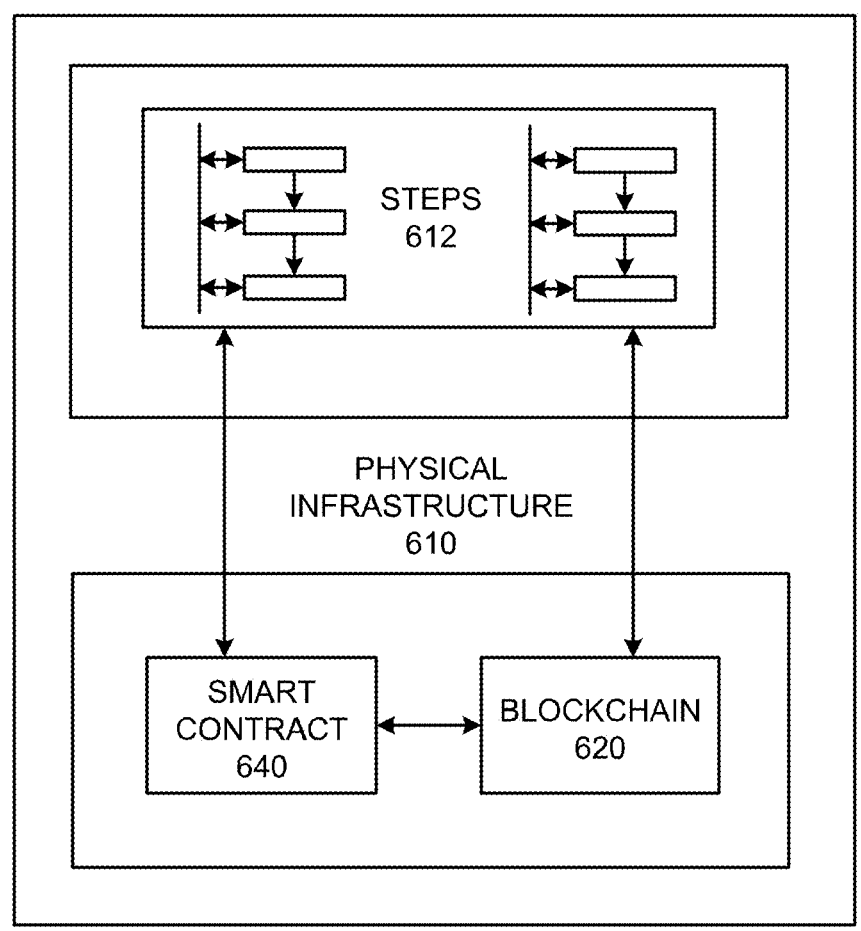
FIG. 6A is a diagram illustrating a physical infrastructure configured to perform various operations on the blockchain in accordance with one or more operations described herein, according to example embodiments.

FIG. 6A illustrates a physical infrastructure configured to perform various operations on the blockchain in accordance with one or more of the methods of operation according to example embodiments. Referring to FIG. 6A, configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
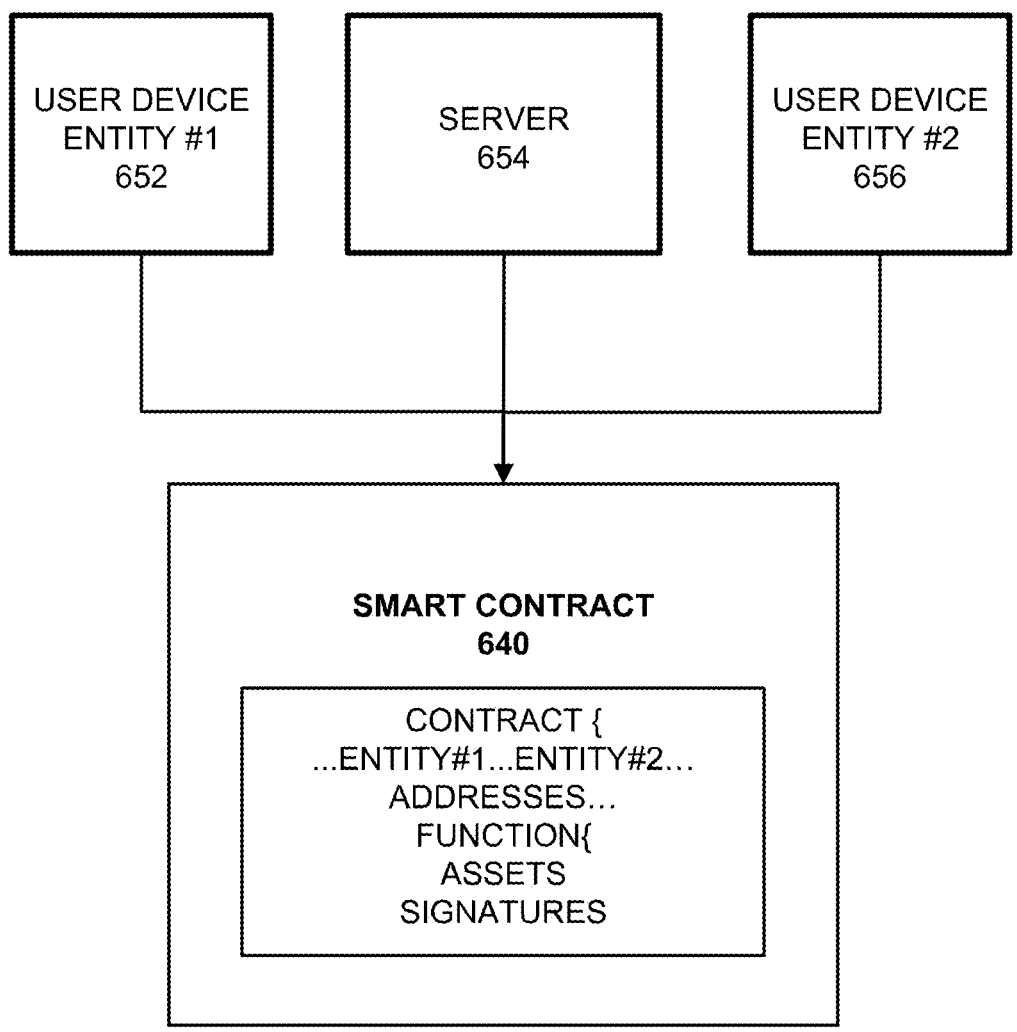
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
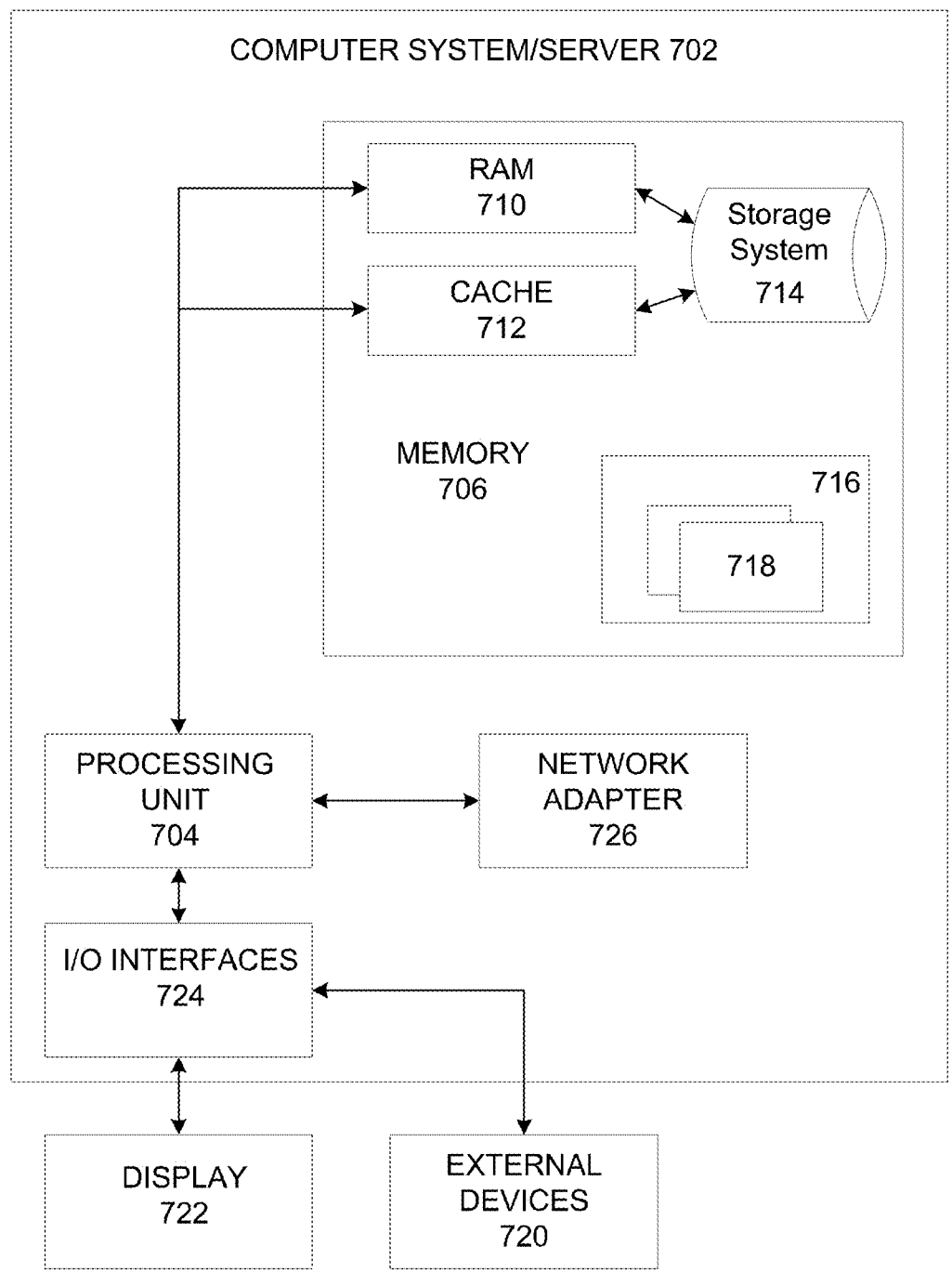
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be an organizing node, a requesting node, a network node, a combination of nodes (e.g., organizer node and network node), and the like.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 (e.g., network interface, etc.) communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the processor 704 may generate an initial seed and allocate one or more authorized bits of the initial seed to each block from among a plurality of blocks in a distributed ledger (e.g., seed blockchain). The processor 704 may store the initial seed and an identification of which authorized bits of the initial seed are allocated to each block of the distributed ledger. The authorized bit sequence may be stored in the block or otherwise provided to the network nodes such as through broadcast transmission, etc. The distributed ledger may be stored in memory 706 and replicated across all of the nodes in the lottery distributed ledger. The network interface 726 may receive a final seed value that is partially generated by each of the plurality of network nodes via the distributed ledger based on the authorized bits allocated to and updated by each respective network node. In this example, the processor 704 may generate a random sequence based on the final seed value and store the random sequence in a block of a verification distributed ledger. Here, the receiving may include receiving seed distributed ledger data (e.g., authorized bits) that has been encrypted by network nodes, decrypting the seed distributed ledger data, and determining a final seed based on the decrypted data.

According to various other embodiments, the network interface 724 may receive an initial seed generated by an organizing node of a distributed ledger network that includes a plurality of distributed ledger nodes. For example, the initial seed may be retrieved from a distributed ledger received from a node in the distributed ledger network, and the like. The processor 704 may identify authorized bits of the initial seed which are uniquely allocated to a block of the distributed ledger associated with the network node from among the plurality of network nodes, modify the identified authorized bits of the initial seed, encrypt the modified authorized bits using an encryption key of the network node, and store the encrypted authorized bits in a block of the distributed ledger that includes blocks of authorized bits of each of the plurality of network nodes. In this example, the processor 704 may generate or otherwise assemble a final seed using the authorized bits modified by the network node and other authorized bits modified by the plurality of network nodes stored in the distributed ledger and the network interface is further configured to transmit the final seed to the organizing node.

FIGS. 8A and 8B illustrate methods 800A and 800B of an organizing node in a lottery distributed ledger network, according to example embodiments. For example, the organizing node may be a distributed ledger peer and may include a server, a database, a cloud platform, a user device, a kiosk, and the like. Referring to FIG. 8A, in 810 the method 800A includes generating an initial seed and, in 820, allocating one or more authorized bits of the initial seed to a plurality of blocks on a distributed ledger (e.g., a seed blockchain, etc.) Here, the initial seed may be a numerical value that is randomly generated and which includes a plurality of bits.

The authorized bits may be bits within the initial seed (or bit positions) that are allocated to a block and which is associated with a network node. Each block may be allocated different authorized bits (e.g., mutually exclusive bits) of the initial seed. Accordingly, each network node may access the distributed ledger, receive access to a block, and may be responsible for modifying authorized bits associated with that respective block when it interacts with the distributed ledger. The node may store the updated authorized bits of a block via the same block of the distributed ledger. In some embodiments, the allocating may include allocating a same amount of authorized bits from the initial seed to each block from among the plurality of blocks corresponding to a plurality of network nodes. In some embodiments, the amount of authorized bits allocated to each block may be determined based on a number of bits in the initial seed and an amount of nodes included in the plurality of network nodes.

In 830, the method includes storing the initial seed and an identification of which authorized bits of the initial seed are allocated to each block within a plurality of blocks of the distributed ledger. For example, the block may include an ID of a network node (e.g., a requesting node) associated with the block, an initial seed value, an identification of which bits of the initial seed value are allocated to the respective block corresponding to the network node of the ID, and the like. When all network nodes update their respective authorized bits of the initial seed, the network nodes may store the updated values on the seed distributed ledger in encrypted form.

In 840, the method includes receiving a final seed value that is partially generated by each of the plurality of nodes configured to access the distributed ledger based on the authorized bits updated by each respective node among the plurality of network nodes. For example, the receiving the final seed may include receiving an encryption key of each of the plurality of nodes and decrypting encrypted authorized bits updated by each respective node stored in the seed distributed ledger based on a respective encryption key of each respective node. In this example, the method may further include assembling the final seed based on the encrypted authorized bits updated by each respective node from among the plurality of network nodes.

In 850, the method includes generating a random sequence value based on the final seed value and storing the random sequence value in a block of the distributed ledger. The random sequence may be a sequence of randomly generated numbers corresponding to a lottery ticket, lottery balls, lottery numbers, and the like. In some embodiments, each network node may generate a corresponding random sequence and transmit a notification to the organizing node indicating whether the network node has verified the random number sequence generated by the organizing node (by generating the same random number sequence). In this example, referring to FIG. 8B, the method 800B may include receiving a verification of the random sequence from a consensus of the plurality of network nodes, in 852, determining the random sequence is valid based on the consensus in 854, and outputting the verified random sequence to a lottery system, in 856.

Figure 9B:
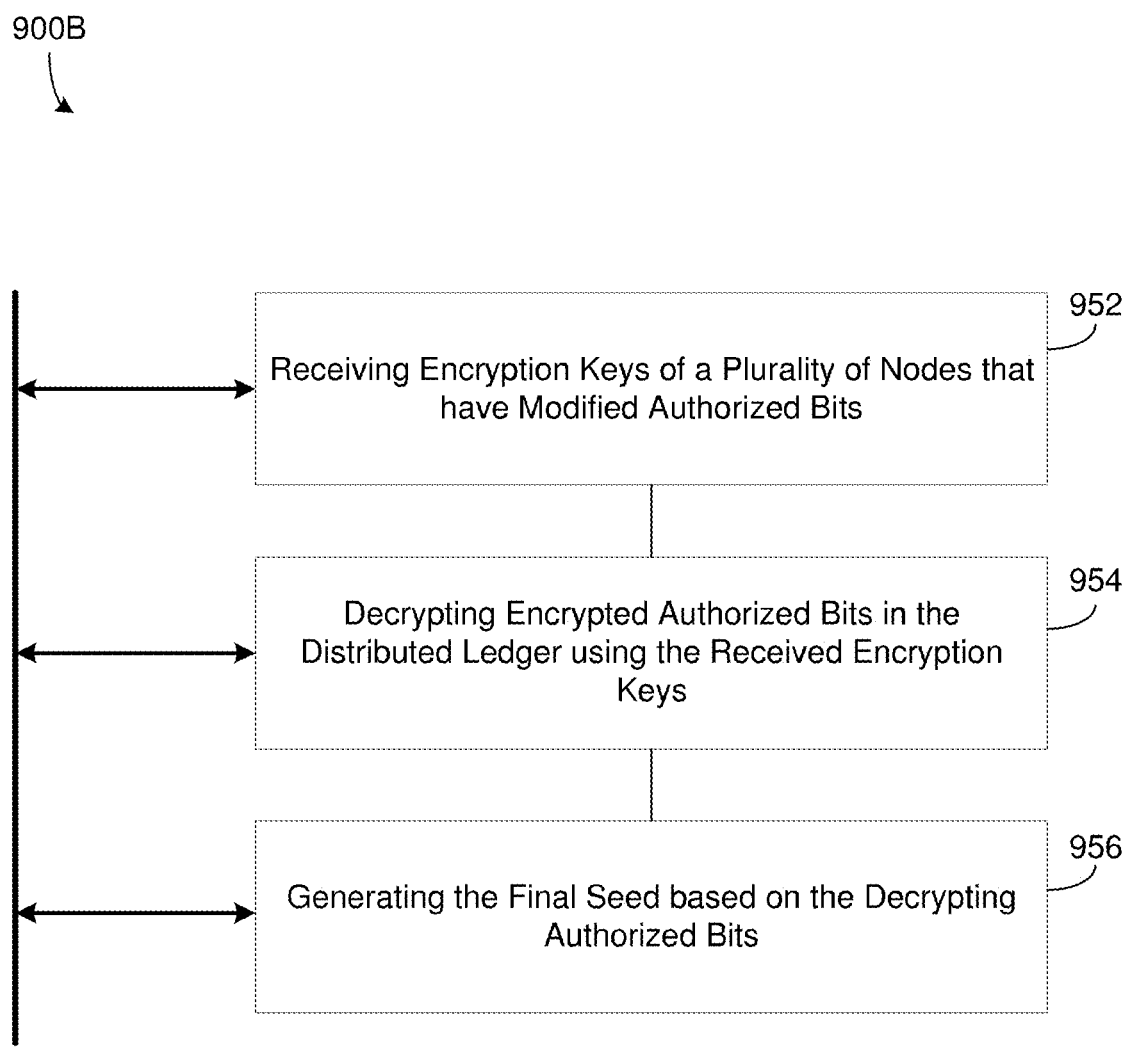

FIGS. 9A and 9B illustrate methods 900A and 900B of a network node in a lottery distributed ledger network, according to example embodiments. For example, the network node may be a distributed ledger peer node and may include a server, a database, a cloud platform, a user device, a kiosk, and the like. In some cases, the network node may be a requesting node, an organizing node, or a combination thereof. Referring to FIG. 9A, in 910 the method 900A includes identifying authorized bits of the initial seed which are uniquely allocated to a block on a distributed ledger (e.g., a seed blockchain) associated with the network node from among the plurality of network nodes Here, the initial seed may be stored in the distributed ledger and may be retrieved by the network node via an encryption. Each network node may have a unique set of bits from the initial seed which are authorized to be updated or otherwise modified the network node. As a result, each network node may partially generate a final seed value.

In 920, the method includes modifying the identified authorized bits of the initial seed and encrypting the modified authorized bits using an encryption key of the network node. For example, the authorized bits may be updated using a random sequence generator to generate a random number or sequence of random numbers for the authorized bits. In 930, the method includes storing the encrypted authorized bits in a block of the distributed ledger that includes authorized bits modified by at least one other node from among the plurality of network nodes. For example, the network node may encrypt the modified/updated authorized bits with a private key and store the encrypted bits in a block of the distributed ledger. In some embodiments, the method may further include transmitting the encryption key of the network node to the plurality of network nodes for decrypting the authorized bits of the network node stored in the seed distributed ledger.

Furthermore, in 940, the method may include assembling a final seed using the authorized bits of the initial seed modified by the network node and other authorized bits of the initial seed modified by the at least one other node which are stored in a block of the distributed ledger. In this example, the method may further include transmitting the generated final seed to the organizing node. For example, in FIG. 9B, the method 900B may include receiving encryption keys of each of the plurality of network nodes which are published by the plurality of network nodes to nodes of the lottery distributed ledger system, in 952. The method 900B may further include decrypting encrypted authorized bits modified by each of the plurality of network nodes stored in the distributed ledger based on the received encryption keys, in 954, and generating the final seed based on the decrypted authorized bits of each network node which are combined to generate a full seed value based on different bit segments (authorized bits) updated by each respective network node, in 956. As a result, the final seed value can be partially generated by each of the network nodes in the lottery distributed ledger system.

In some embodiments, the method 900 may further include generating a random sequence value based on the final seed value and storing the generated random sequence value in a block of the distributed ledger. In some embodiments, the method 900 may further include receiving a random sequence value from the organizing node, verifying the random sequence value generated by the organizing node based on the generated random sequence value, and transmitting a result of the verification to the organizing node.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An organizing node system, comprising:
a processor coupled to a memory configured to generate an initial seed, allocate one or more authorized bits of the initial seed to each of a plurality of blocks in a distributed ledger, and store the initial seed and an identification of which authorized bits of the initial seed are allocated to each block among the plurality of blocks of the distributed ledger; and
a network interface configured to receive a final seed value that is partially generated by each of a plurality of nodes configured to access the distributed ledger based on authorized bits of respective blocks updated by each respective node;
wherein the network interface is further configured to receive a respective encryption key of each of the plurality of nodes and the processor is configured to decrypt encrypted authorized bits of each respective node stored in the distributed ledger based on a respective encryption key of each respective node;
and the processor is further configured to assemble the final seed based on the encrypted authorized bits updated by each respective node from among the plurality of nodes.

2. The organizing node system of claim 1, wherein the processor is further configured to generate a random sequence based on the final seed value and store the random sequence in a block of the distributed ledger; and the network interface is further configured to receive a verification of the random sequence from a consensus of the plurality of nodes, and the processor is configured to determine that the random sequence is valid based on the consensus, and output the verified random sequence to a lottery system.

3. The organizing node system of claim 1, wherein the processor is configured to allocate a same amount of authorized bits from the initial seed to each block on the distributed ledger from among the plurality of blocks associated with the plurality of nodes.

4. The organizing node system of claim 1, wherein an amount of authorized bits allocated to each block is determined based on a number of bits in the initial seed and an amount of nodes included in the plurality of nodes.

5. A method of an organizing node, comprising:
generating an initial seed;
allocating one or more authorized bits of the initial seed to each of a plurality of blocks in a distributed ledger;
storing the initial seed and an identification of which authorized bits of the initial seed are allocated to each respective block among the plurality of blocks of the distributed ledger;
receiving a final seed value that is partially generated by each of a plurality of nodes configured to access the distributed ledger based on authorized bits of respective blocks updated by each respective network node; and
receiving the final seed comprises receiving a respective encryption key of each of the plurality of nodes and decrypting encrypted authorized bits of each respective node stored in the distributed ledger based on a respective encryption key of each respective node;
and receiving the final seed further comprises assembling the final seed based on the encrypted authorized bits updated by each respective node from among the plurality of nodes.

6. The method of claim 5, further comprising generating a random sequence value based on the final seed value and storing the random sequence value in a block of the distributed ledger; and receiving a verification of the random sequence from a consensus of the plurality of nodes, determining that the random sequence is valid based on the consensus, and outputting the verified random sequence to a lottery system.

7. The method of claim 5, wherein the allocating further comprises allocating a same amount of authorized bits from the initial seed to each block on the distributed ledger from among the plurality of blocks associated with the plurality of nodes.

8. The method of claim 5, wherein the amount of authorized bits allocated to each block is determined based on a number of bits in the initial seed and an amount of nodes included in the plurality of nodes.

9. A network node system, comprising:
a processor coupled to a memory configured to identify authorized bits of an initial seed which are uniquely allocated to a block stored in a distributed ledger accessed by a plurality of nodes, modify the identified authorized bits of the initial seed, encrypt the modified authorized bits using an encryption key of the node, and store the encrypted authorized bits in a block of the distributed ledger which includes a block of authorized bits updated by at least one other node;
wherein a final seed is capable of being assembled using authorized bits modified by the node and other authorized bits modified by the at least one of the plurality of nodes stored in the distributed ledger;
and the processor is configured to receive encryption keys of each of a plurality of nodes that have modified authorized bits of the initial seed and stored the modified bits on the distributed ledger, decrypt encrypted authorized bits modified by each of the plurality of nodes stored in the distributed ledger based on the receipt of the encryption keys; and generate the final seed based on the decrypted authorized bits.

10. The network node of claim 9, wherein the processor is further configured to transmit the encryption key of the node to the plurality of nodes to decrypt the authorized bits stored in the distributed ledger.

11. The network node of claim 9, wherein the processor is further configured to generate a random sequence value based on the final seed value and store the generated random sequence value in a block of the distributed ledger.

12. The network node of claim 9, wherein the processor is further configured to receive a random sequence value from the organizing node, verify the random sequence value generated by the organizing node based on the generated random sequence value, and transmit a result of the verification to the organizing node.

13. A method of a network node, comprising:
identifying authorized bits of an initial seed which are uniquely allocated to a block stored in a distributed ledger accessed by a plurality of nodes;
modifying the identified authorized bits of the initial seed and encrypting the modified authorized bits using an encryption key of the network node; and
storing the encrypted authorized bits in a block of the distributed ledger that includes a block of authorized bits updated by at least one other node;
wherein a final seed is capable of being assembled using the authorized bits modified by the node and other authorized bits modified by at least one other node stored in the distributed ledger;
and receiving encryption keys of each of a plurality of nodes that have modified authorized bits of the initial seed and stored the modified bits on the distributed ledger, decrypting encrypted authorized bits modified by each of the plurality of nodes stored in the distributed ledger based on the received encryption keys; and generating the final seed based on the decrypted authorized bits.

14. The method of claim 13, further comprising transmitting the encryption key of the node to the plurality of nodes for decrypting the authorized bits modified by the node stored in the distributed ledger.

15. The method of claim 13, further comprising generating a random sequence value based on the final seed value and storing the generated random sequence value in a block of the distributed ledger.

16. The method of claim 13, further comprising receiving a random sequence value from the organizing node, verifying the random sequence value generated by the organizing node based on the generated random sequence value, and transmitting a result of the verification to the organizing node.

17. A non-transitory computer readable medium having stored therein instructions that when executed cause a computer to perform a method comprising:
generating an initial seed and allocating one or more authorized bits of the initial seed to each of a plurality of blocks in a distributed ledger;
storing the initial seed and an identification of which authorized bits of the initial seed are allocated to each respective block among the plurality of blocks of the distributed ledger;
receiving a final seed value that is partially generated by each of a plurality of nodes configured to access the distributed ledger based on authorized bits of respective blocks updated by each respective node; and
receiving a respective encryption key of each of the plurality of nodes and decrypting encrypted authorized bits of each respective node stored in the distributed ledger based on a respective encryption key of each respective node;

and assembling the final seed based on the encrypted authorized bits updated by each respective node from among the plurality of nodes.

18. The non-transitory computer readable medium of claim 17, wherein the method further comprises generating a random sequence value based on the final seed value and storing the random sequence value in a block of the distributed ledger; and receiving a verification of the random sequence from a consensus of the plurality of nodes, and outputting the verified random sequence to a lottery system.

19. The non-transitory computer readable medium of claim 17, wherein the allocating further comprises allocating a same amount of authorized bits from the initial seed to each block on the distributed ledger from among the plurality of blocks associated with the plurality of nodes.

* * * * *